US008593250B2

(12) United States Patent
Schorn

(10) Patent No.: US 8,593,250 B2

(45) Date of Patent: Nov. 26, 2013

(54) ACCESS CONTROL DEVICE

(75) Inventor: Josef Schorn, Buehl (DE)

(73) Assignee: Kaba Gallenschuetz GmbH, Buehl (DE)

( * ) Notice: Subject to any disclaimer, the term of this patent is extended or adjusted under 35 U.S.C. 154(b) by 535 days.

(21) Appl. No.: 12/735,431

(22) PCT Filed: Jan. 23, 2009

(86) PCT No.: PCT/DE2009/075001

§ 371 (c)(1), (2), (4) Date: Jul. 15, 2010

(87) PCT Pub. No.: WO2009/092375

PCT Pub. Date: Jul. 30, 2009

(65) Prior Publication Data

US 2010/0308959 A1 Dec. 9, 2010

(30) Foreign Application Priority Data

Jan. 24, 2008 (DE) ........................ 10 2008 005 770
Mar. 31, 2008 (DE) ........................ 10 2008 016 516

(51) Int. Cl.
*G05B 19/00* (2006.01)

(52) U.S. Cl.
USPC ........... 340/5.2; 340/5.31; 340/5.53; 340/5.6; 340/5.8; 340/10.1; 340/426.26; 340/541; 340/552; 342/28; 235/382; 713/186; 70/101

(58) Field of Classification Search
USPC ......... 340/5.2, 541, 5.6, 5.52, 5.8, 5.31, 5.53, 340/426.26, 552, 10.1; 235/382.5, 382; 348/156; 726/12; 342/28; 70/101; 713/186
See application file for complete search history.

(56) References Cited

U.S. PATENT DOCUMENTS

| | | | |
|---|---|---|---|
| 5,615,622 A * | 4/1997 | Moses et al. | 109/2 |
| 5,845,692 A * | 12/1998 | Kellem et al. | 160/118 |
| 5,988,645 A * | 11/1999 | Downing | 273/348 |
| 6,856,862 B1 * | 2/2005 | Feltner | 700/245 |

(Continued)

FOREIGN PATENT DOCUMENTS

| | | |
|---|---|---|
| DE | 10 2004 048 403 | 4/2006 |
| EP | 1 102 216 | 5/2001 |
| FR | 2 895 122 | 6/2007 |
| WO | WO 03/088157 | 10/2003 |

OTHER PUBLICATIONS

International Search Report.

*Primary Examiner* — Benjamin C Lee
*Assistant Examiner* — Quang D Pham
(74) *Attorney, Agent, or Firm* — Collard & Roe, P.C.

(57) ABSTRACT

The invention relates to an access control device (1) having at least one access barrier element, to which at least one read unit and/or sensor unit for acquiring legitimation and/or security features is assigned, the access barrier elements and the read and sensor units each having a data connection to a computer unit (5), which compares the acquired or read features to stored data and opens or keeps closed the access barrier according to a preset. Proceeding from the problem that in the case of access control devices (1) of this type, it is only possible to react to changed requirements or a changed security condition by cumbersome re-parameterization of the facility, an additional operating element (8), which is assigned to the computer unit (5), is proposed in the context of the invention, using which it is possible to select between various security steps by simply adjusting the operating element (8).

4 Claims, 3 Drawing Sheets

(56) References Cited

U.S. PATENT DOCUMENTS

Figure 1:
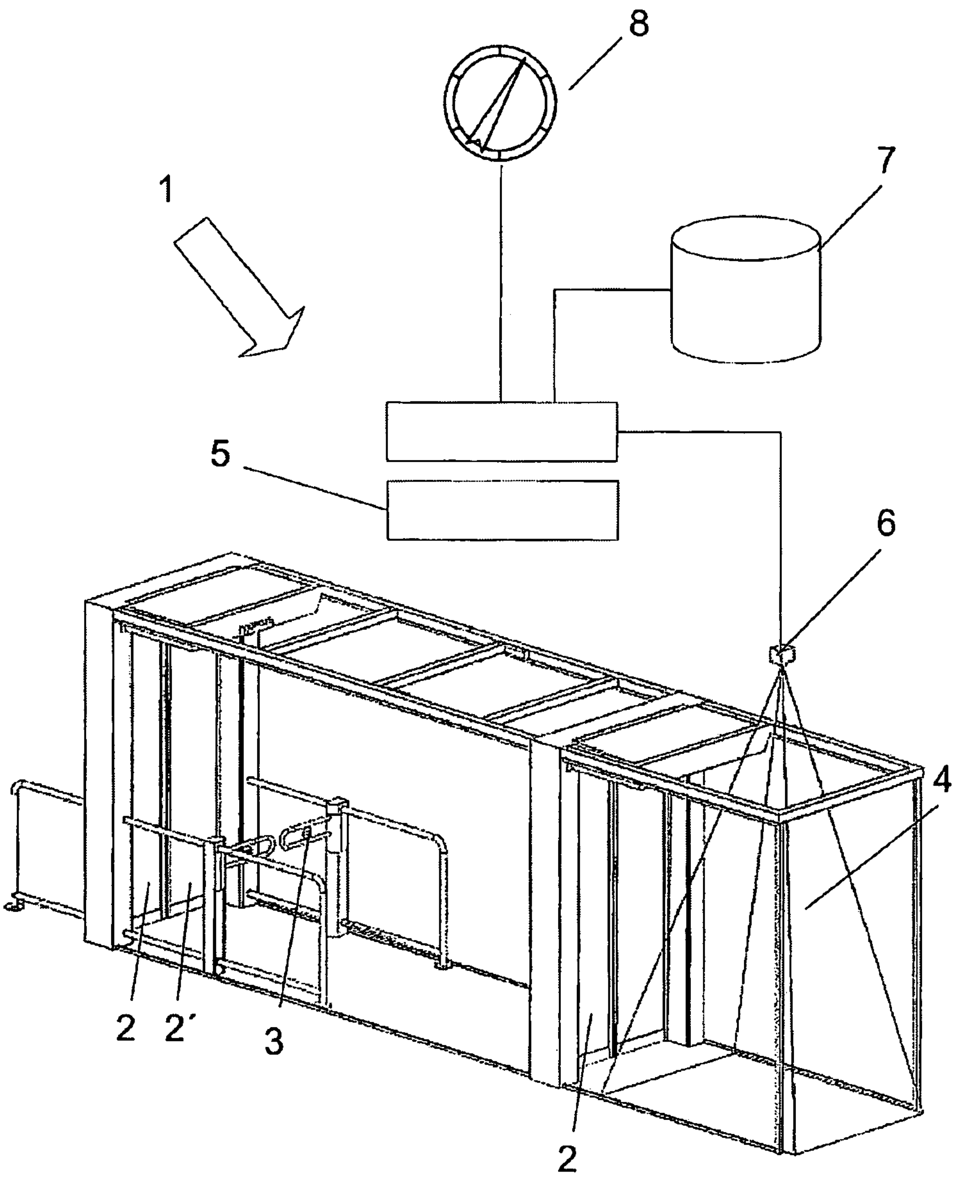

| | | | | |
|---|---|---|---|---|
| 7,158,007 | B2 * | 1/2007 | Kawamoto | 340/5.64 |
| 7,558,965 | B2 * | 7/2009 | Wheeler et al. | 713/186 |
| 7,703,241 | B2 * | 4/2010 | Eshel et al. | 49/42 |
| 7,805,209 | B2 * | 9/2010 | Bechtel et al. | 700/79 |
| 7,991,193 | B2 * | 8/2011 | Hampapur et al. | 382/103 |
| 8,085,126 | B2 * | 12/2011 | Determan et al. | 340/5.2 |
| 8,193,904 | B2 * | 6/2012 | Kawakita | 340/5.2 |
| 8,269,600 | B2 * | 9/2012 | Floyd | 340/5.2 |
| 8,269,603 | B2 * | 9/2012 | Aoki et al. | 340/5.82 |
| 8,462,994 | B2 * | 6/2013 | Ortiz et al. | 382/115 |
| 2002/0067259 | A1 * | 6/2002 | Fufidio et al. | 340/541 |
| 2002/0121961 | A1 * | 9/2002 | Huff | 340/5.3 |
| 2003/0179127 | A1 * | 9/2003 | Wienand | 342/28 |
| 2003/0217276 | A1 * | 11/2003 | LaCous | 713/186 |
| 2004/0257199 | A1 * | 12/2004 | Fitzgibbon et al. | 340/5.71 |
| 2004/0262383 | A1 * | 12/2004 | Zielinski | 235/382 |
| 2005/0087596 | A1 * | 4/2005 | Larson et al. | 235/382 |
| 2005/0219360 | A1 * | 10/2005 | Cusack et al. | 348/156 |
| 2006/0080541 | A1 * | 4/2006 | Monaco et al. | 713/182 |
| 2006/0101275 | A1 * | 5/2006 | Daniels et al. | 713/182 |
| 2006/0101716 | A1 * | 5/2006 | Vandyck et al. | 49/35 |
| 2006/0102717 | A1 * | 5/2006 | Wood et al. | 235/382 |
| 2006/0150872 | A1 * | 7/2006 | Mesinger | 109/8 |
| 2006/0155441 | A1 * | 7/2006 | Berg et al. | 701/41 |
| 2006/0164240 | A1 * | 7/2006 | Patchell | 340/552 |
| 2007/0130833 | A1 * | 6/2007 | Maital | 49/31 |
| 2008/0052522 | A1 * | 2/2008 | McArdle | 713/182 |
| 2008/0092227 | A1 * | 4/2008 | Eibach et al. | 726/12 |
| 2008/0094171 | A1 * | 4/2008 | Sawhney | 340/5.6 |
| 2008/0186131 | A1 * | 8/2008 | Hanai et al. | 340/5.2 |
| 2008/0222706 | A1 * | 9/2008 | Renaud et al. | 726/4 |
| 2008/0272881 | A1 * | 11/2008 | Goel | 340/5.3 |
| 2009/0002144 | A1 | 1/2009 | Bernard et al. | |
| 2009/0050697 | A1 * | 2/2009 | Sparks et al. | 235/382.5 |
| 2009/0121869 | A1 * | 5/2009 | Graichen | 340/541 |
| 2009/0167485 | A1 * | 7/2009 | Birchbauer et al. | 340/5.2 |
| 2010/0045424 | A1 * | 2/2010 | Kawakita | 340/5.2 |
| 2010/0237987 | A1 * | 9/2010 | Barzacanos | 340/5.54 |
| 2010/0245087 | A1 * | 9/2010 | Gerner et al. | 340/541 |
| 2011/0291798 | A1 * | 12/2011 | Schibuk | 340/5.61 |
| 2012/0044047 | A1 * | 2/2012 | Morgan | 340/5.2 |

* cited by examiner

ACCESS CONTROL DEVICE

CROSS REFERENCE TO RELATED APPLICATIONS

This application is the National Stage of PCT/DE2009/075001 filed on Jan. 23, 2009, which claims priority under 35 U.S.C. §119 of German Application No. 10 2008 005 770.3 filed on Jan. 24, 2008 and German Application No. 10 2008 016 516.6 filed on Mar. 31, 2008. The international application under PCT article 21(2) was not published in English.

The invention relates to an access control device having at least one access control element, which releases or blocks the access to a secured area, a building, or a campus, in particular having a rotating barrier, a turnstile, a revolving door, a camera, or a stop barrier, and at least one read unit for checking at least one legitimation feature, which documents the access authorization, and/or at least one sensor, in particular a light barrier, for checking at least one security feature, such as the number of the passing persons, the barrier elements and the read unit and/or the sensors each being at least indirectly connected to at least one computer unit of the access control device, this computer unit having a storage element, in which permissible legitimation features and security features are stored, and a comparison of the read legitimation features to the stored legitimation features and/or a check of the security features acquired by sensors to the permissible security features being performed using the processor unit and the access element being releasable, preferably automatically, as a function of the result of this comparison.

Thus, for example, an access control device, in particular for the high-security and airport field, is previously known from DE 10 2004 048 403 A1, in which one or more control and identification checking units, such as a document reader, a biometer unit for acquiring biometric features, a camera and/or light barriers for controlling greatly varying test features, such as the person control, the person isolation or person identification, or the access authorization, are assigned to a lock area, which is defined by controlled entry and exit. All of these control units are networked with one another via a central control unit for reconciliation of the test results, for example.

Moreover, a system and a method for automatic or manual regulation of access control levels on the basis of preset security steps is known from US 2006/0080541 A1. In the context of the selection of the defined security step, the access control level can be adapted to the current situation, such as workday or holiday, and to the local situation, such as private or company building. Specifically, in the context of the method according to the invention, the possibility exists of parameterizing a security matrix, which defines the access and security parameters, and adapting the parameters to an altered security step as needed.

Access control devices of this type are used for the controlled release of an access and simultaneously for isolating the persons who wish to enter a secured area, a building, or a campus. It is obvious that it is increasingly desirable in the context of automation for the checking of the legitimation features and/or security features to be performed extensively automatically, i.e., the acquired and/or output data are compared to stored data and the release of the access is performed or not as the function of these data.

In this case, faster and faster computer units and more and more reasonably priced and larger storage elements have allowed increasingly more complex features to be checked in connection with the release of an access. Thus, it has become possible in recent years to acquire biometric features, such as a fingerprint, a personal image, or an iris image, and to check using stored data whether the person desiring access is actually permitted. The check of the biometric features is supplemented by further checks, such as a vitality check with respect to recorded fingerprints or camera monitoring of an enclosed space so that only one person passes the access at a time, and other possible security features.

It is possible to operate the access barrier elements, which are always the same, i.e., rotating doors, revolving locks, revolving doors, or other barrier elements, for example, using different sensors and read units depending on the security standard. The more features are additively checked, the higher the security standard. Facilities are often equipped with sensors and read units, which are not even immediately used at the time of delivery, for later adaptation to increased security standards.

An adaptation of the security standards is often unavoidable in operation. This results, on the one hand, from the requirement that the security standard of buildings can be changed during use, for example, in the context of a changed use. It is thus conceivable, for example, that a building which was originally solely an office building is increasingly used for research purposes and the security standard must therefore be elevated. It is also conceivable that higher-value goods, such as objects equivalent to money or money itself are stored in buildings which were previously used non-critically, so that the security standard must therefore be elevated. It is also conceivable that the hazard situation changes as a result of external circumstances, for example, because a series of break-ins in the surroundings requires an elevated security standard.

Finally, there is also the inverted application, namely that a reduction of the security standard is desired by the user, for example, because it has been shown that the originally desired security standard results in undesirably long passage times of the affected persons or the error rate is too high in real operation.

In spite of all precision of facilities of this type, it is unavoidable, for example, in the context of the check that only one person at a time passes a lock, for example, if large pieces of luggage are carried along, multiple light barriers are interrupted, so that the facility suspects that not only one, but rather two persons wish to pass the barrier. It can rapidly occur in the case of an office building, for example, that each person who carries along a briefcase causes an alarm at the facility, with the result that a person of the security personnel must perform a check and the facility must possibly be released manually. It can therefore often result as practical to turn off this control or a single light barrier. However, the wish may exist to add on another check, for example, using a camera and an image analysis, instead of the current check using two light barriers.

Practical experience has shown that typically customers initially require the highest possible security standard when an automatically operating access control device is put into operation and a parameterization of the facility is performed accordingly. It often results therefrom in the course of further operation that the security standard is only to be unified with difficulty with the requirements of daily operation, so that cumbersome post-parameterizations must be performed, until finally a setting is found in the course of "trial and error", which offers an optimum security standard, on the one hand, and allows somewhat undisturbed operation, i.e., undisturbed access and possibly also exit from a secured area, on the other hand.

The complex retrofitting of the facilities with interruption of operation in each case is perceived as unpleasant by all participants and is additionally capable of drastically reducing the acceptance of an access control device of this type. This often has the result that the originally desired security standard is set rather too low than would be desirable in the interest of undisturbed operation. The rapid acceptance and functional capability of an access control device thus represents a significant requirement for a complex facility of this type.

Proceeding from this prior art, the invention is based on the object of providing an improved access control device, which particularly offers easier operation during the setup and during operation of an access control device of this type.

This object is achieved by an access control device according to the features of the main claim. Advantageous embodiments of the invention may be inferred from the subclaims.

The object is achieved in that an operating unit, using which predetermined security steps may be set, is assigned to the central computer unit to analyze and reconcile the output legitimation features and the acquired security features. The setting of the security steps represents the selection of predetermined, advisable parameterizations of the central computer unit, i.e., for example, a selection of the acquired security and/or legitimation features and the particular tolerance threshold assigned to the check of the features to be performed. The security steps situated in connection with the operating element represent a selection of the advisable security steps for the particular operating situation, the operating element being connectable to the computer unit having different, predefined parameterizations depending on the application.

In contrast to typical parameterizations, the corresponding facilities are thus offered having different parameterizations already predefined. The invention does not exhaust every different possible parameterization of the access control device in the selection, but rather additionally offers, via the additional operating element, the possibility of performing an adjustment capability without further parameterization of the facility or cumbersome retrofitting or parameterization simply using a simple operating element and selection element. An operating element of this type can be operated by the typical security personnel or a doorman without any knowledge of the facility per se.

The additional operating element also allows changed conditions to be dealt with immediately in a simple manner, i.e., to temporarily reduce the security features in the event of a large crowd and subsequently to continue the operation again at an increased security step.

In a concrete embodiment, the operating element is a simple rotary switch, using which a selection can be made between various security steps. It can be a graduated or continuous rotary switch. In the case of an embodiment having a continuous rotary switch, non-graduated features are also changed by the continuous adjustment, i.e., progressive parameter specifications or tolerance thresholds. In the technical aspect, a continuous rotary switch of this type can be implemented using a variable resistor, for example. The continuous parameterization of access control devices is not only a completely novel idea of security technology. It also allows an individual adaptation to the security requirements of the customer, which was not possible until now. This is also—also for the first time—without any technicians.

In a further advantageous embodiment, special parameterization software is assigned to the operating unit in such a manner that using this software, the security steps selectable using the operating element can be parameterized. However, the parameterization software also allows the parameterization which has been performed once to be changed as needed, i.e., the selected security steps to be adapted in their concrete embodiment to the changed operation. The use of the parameterization software thus also allows, via the improved adaptation capability through the operating unit, for the operating unit per se to be adapted to changed operation. The parameterization of the parameterization software typically remains reserved to the technicians, however.

In a preferred embodiment, a sensor network having multiple sensors is assigned to the access control device, so that the security standard can already be easily changed by turning on and off individual sensors or sensor groups. This is also performed in a way which is simple and comprehensible to the operating personnel by adjustment of the central operating element.

In an advantageous embodiment, the sensor network can at least partially include optical sensors which implement an optical lock transversely to the passage direction. The optical sensors are oriented so that their optical axes intersect to form rhomboids with the effect that the number of the rhomboids and thus the precision of the optical monitoring are changed by adjusting the central operating element.

In a further embodiment of the invention, using the improved access control device in connection with the check of biometric features as a legitimation feature has proven itself. In particular the complex requirements in the case of the check of biometric features require the possibility of a subsequent adjustment of an access control device of this type by using an easy-to-use operating unit.

In an advantageous refinement, the central computer unit for checking the security and/or legitimation features can be incorporated in a higher-order data network and a check of the access control, or also a readjustment of the operating unit, can thus be performed by remote control. The corresponding incorporation of the computer unit, but also the operating unit, allows maintenance or readjustment, for example, by the manufacturer, without a corresponding inspection of the facility being required on location.

The invention is explained in greater detail hereafter on the basis of an exemplary embodiment shown in the drawing. The exemplary embodiment is solely used for explanation in greater detail, manifold other embodiments also being conceivable in the context of the invention, of course.

Figure 2:
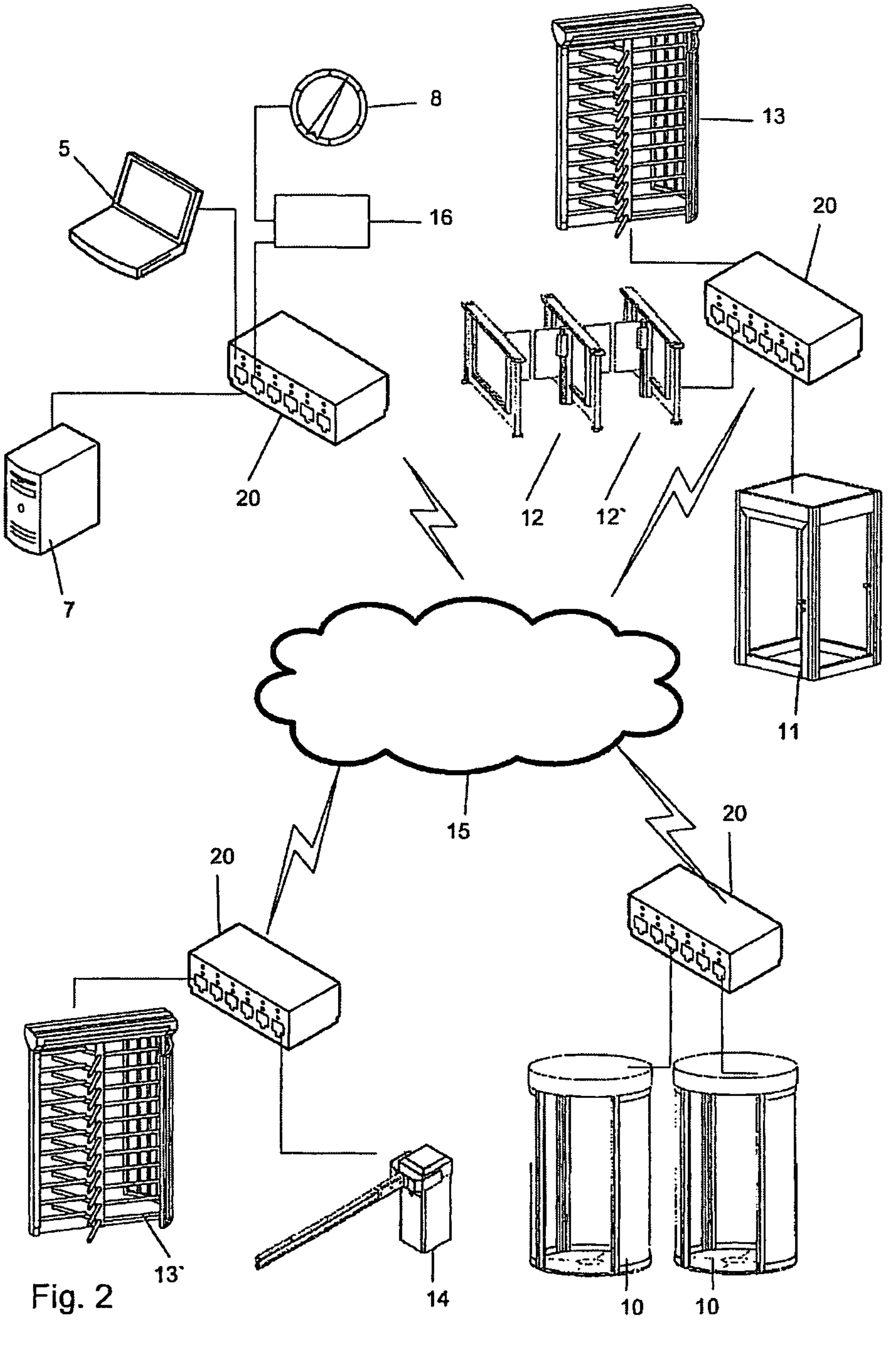
Figure 3:
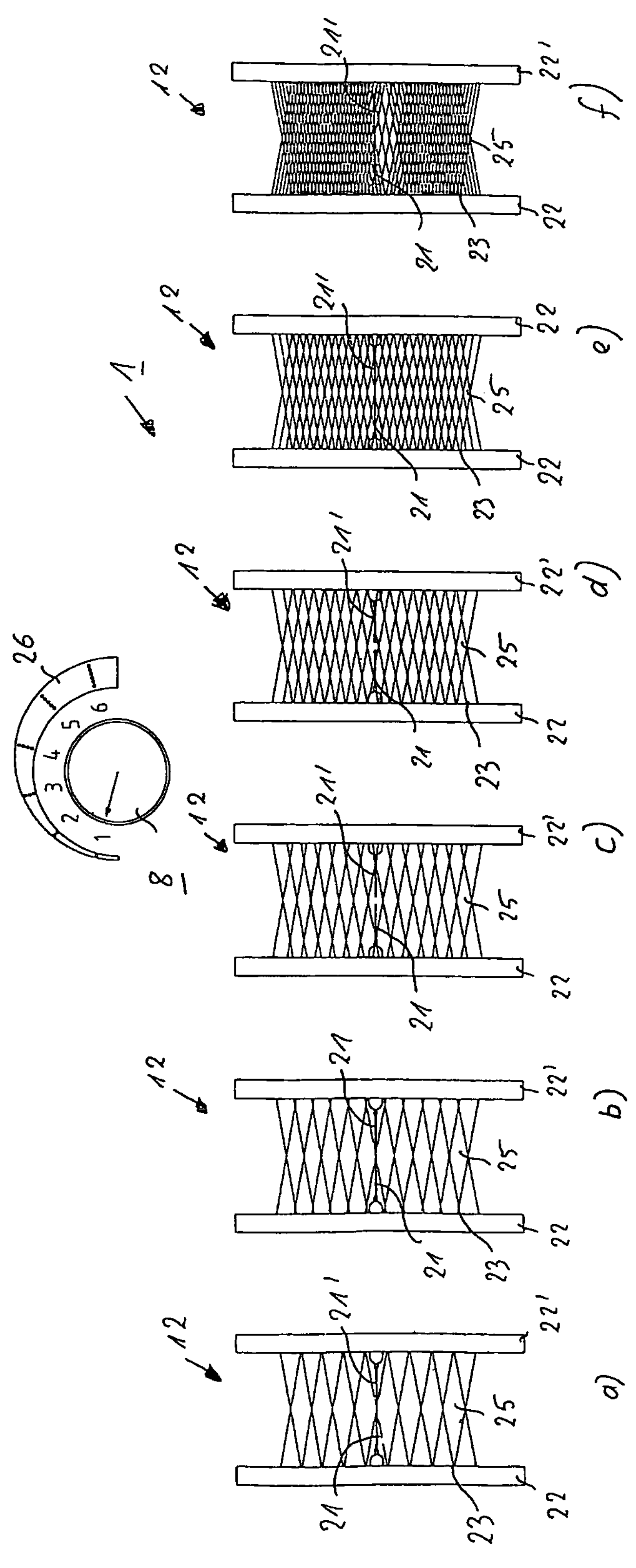

In the figures:

FIG. 1: shows an access lock in a perspective view having a computer unit assigned to this access lock and an operating element assigned to this computer unit, FIG. 2: shows an access control device having multiple access barrier elements in a perspective view, and FIG. 3: shows another access control device in a top view as a schematic illustration.

FIG. 1 shows an access control device 1, in the concrete case, this being a passage lock having multiple access barrier elements, namely multiple pivot doors 2, 2' and a double pivot barrier 3 and optionally further access barrier elements (not shown here). In the passage direction, a camera-monitored area 4, which is indicated by the beam illustration, is defined by the front pivot door 2, in which it is first checked (in a way not of greater interest here) whether only one person is located in the enclosed area. In addition, an acquisition of biometric features, i.e., for example, the analysis of the facial image, can be performed in the monitored area 4 using the for checking for isolation.

Both the pivot doors 2, 2' and also the double pivot barriers 3 are each provided with an electric motor drive, which have a data connection separately or jointly to a central computer unit 5. The central computer unit 5 is additionally connected to the camera(s) 6 for monitoring the monitored area 4.

The pivot door 2 is only opened in an additional step when the camera 6 signals that only one person is situated in the monitored area 4. Thereafter, for example, the biometric data or further security features and/or, using a read unit (not shown in greater detail), legitimation features may be checked. The double pivot barrier 3 and the subsequent pivot door 2' are only opened when these data also correspond at least to a predefined degree to the stored data or the predefined data.

All acquired or output features are assigned to the central computer unit 5. The computer unit 5 is additionally connected to a storage unit 7, in which the permissible legitimation features are stored, for example. The computer unit 5 then performs a comparison to the stored features and only performs the release of the individual access barrier elements of the access control device 1 for the case in which they match to a predefined extent.

The central computer unit 5 is additionally provided with an operating unit 8, a so-called “security wheel”. This is a continuously adjustable rotary switch, using which the particular desired security step can be predefined by the particular monitoring or operating personnel. For example, through the adjustment of the operating unit 8, the tolerance range of the monitored area 4 is adjusted, i.e., the dimensions which are still accepted in order to conclude that only one person is actually located in the monitored area 4. Furthermore, via the adjustment of the operating unit 8, it can simultaneously be adjusted which deviations from the stored biometric data (matching image) with respect to the acquired data are still accepted. It is obvious that as the security standard is turned down, the computing effort is reduced and the control speed of the facility is thus elevated. However, with increasing reduction of the tolerance thresholds, the danger arises that two persons will pass the facility, although only one is legitimized. It is also conceivable to reduce the security standard only temporarily via the operating unit 8 in times of large crowds.

The security wheel offers the capability of adapting the security standard continuously to the current hazard condition or readjusting it for other reasons at any time optimally in the truest meaning of the word using a handle. This change is possible without any technicians because of the novel operating element (8). The security setting of the access control device can grow with the requirements of the customers because of this solution, without more being necessary for this purpose than selecting a new setting on the operating element (8).

In another embodiment according to FIG. 2, a larger, secured campus is assumed, which is secured using a plurality of various access barrier elements.

In the concrete case, for example, to secure a building, two displaceable circular segments are each combined with a revolving door, i.e., a so-called round door 10, 10', a personnel lock 11 secured using a barrier door, and two personnel locks 12, 12' (entry and exit) secured using pivotable flaps, and a typical turnstile 13 and a further turnstile 13' and a stop barrier 14 are used for securing the area to be secured.

The access barrier elements are combined into functional units, for example, because they secure a defined area. Thus, for example, the two round doors 10, 10' having the displaceable circular segments may secure the entry and exit of a building unit. The typical turnstile 13 having the two flaps 12, 12' and the cubically constructed personnel lock 11 may also be combined into a unit to secure a shared area, such as a campus having a building located therein. A further unit comprises a further typical turnstile 13' and the stop barrier 14, as may be used to secure a parking space, for example.

The access control device 1 having its plurality of access barrier elements thus represents a typical safeguard of an operating campus.

The access barrier elements, which are combined into functional units, are each connected to an interface 20, which records the data acquired by the read units and sensor elements, which are assigned to the particular access blocking devices, and optionally transmits signals to the electric motor drives of the facilities. All interfaces 20 of the fluid have a data connection to one another via a data network 15, such as the intranet or the Internet.

An interface 20 additionally has a data connection to a data-bank, which is stored in a corresponding storage element 7.

This interface 20 is additionally connected to the central computer unit 5. The additional operating unit 8 is also connected, with special parameterization software 16 interposed, to the same interface.

As a result, the check of the data cited by the individual access barrier elements is performed by reconciliation with the legitimation and security features stored in the databank in consideration of the security step predefined via the central operating unit 8. A readjustment of the facility can be performed using the parameterization software 16 so that the parameterization assigned to the individual security steps is subsequently changed. A preset of the facility is performed at the factory using the parameterization software 16.

The exemplary embodiment 2 shows in particular how the task of parameterization of a complete access control device 1 for an extended operating campus, which is nearly completely incomprehensible per se to typical operating personnel, can be adapted to the particular demand and optionally also to changed conditions by simple adjustment of a single operating element 8.

For further explanation, a further access control device 1 is shown in FIG. 3, which only comprises one passage lock 12 having flaps 21, 21', which block or release a control passage as needed, in this example, the passage being delimited on both sides by guide elements 22, 22'. Optical sensors 23, which are spaced apart from one another as needed in one or more optical control levels, are situated over the longitudinal extension of the guide elements, whose optical axes are situated transversely to the passage direction through the passage lock 12 in the beam direction and whose beam directions intersect diagonally in such a manner that optical control rhomboids 25 are thus implemented along the passage. In addition, a rotary switch is assigned to the passage lock 12 as the central operating element 8. As indicated by the rising numbers in the operating display 26, which is assigned to the central operating element 8, the security standard of the passage lock 12 can be easily adjusted via the adjustment of the rotary switch. In the exemplary embodiment, individual optical sensors are turned on or off because of the adjustment of the central operating element 8. According to the schematic illustration in FIG. 3, the security standard is continuously increased from right to left from FIGS. 3*a*) to FIG. 3*f*) in that more and more optical sensors are turned on. The optical control rhomboids 25 thus become smaller and smaller, and the network of the optical acquisition becomes finer and finer. It is thus conceivable that a security standard according to FIG. 3*a* is just sufficient to recognize that a person passes the lock, it also being able to be exactly differentiated using a finer and finer network according to FIG. 3*f*), for example, whether it is one or two persons and it also being able to be differentiated whether a child or a briefcase is carried along on the hand of a person. The finer the network, the better the access control, but also the greater the probability of false alarms. The security standard can be optimally adapted to the situation and the requirements in a simple manner via the operating element 8.

LIST OF REFERENCE NUMERALS

1 access control device
2, 2' pivot door
3 double barrier element
4 monitored area
5 central computer unit
6 camera
7 storage unit
8 central operating element
10, 10' round door
11 personnel lock
12, 12' passage lock having flaps
13, 13' turnstile facility
14 stop barrier
15 data network
16 parameterization software
20 interface
21, 21' flap
22, 22' guide element
23 sensors
25 control rhomboids
26 operating display

The invention claimed is:

1. An access control device having:

at least one access barrier element for deblocking and blocking access to a secured zone, a building, or an area, wherein the at least one access barrier element comprises a rotating barrier, a turnstile, a revolving door, a camera, or a stop barrier, and at least one read unit for checking at least one legitimation feature documenting an access authorization, and a sensor network comprising a plurality of sensors assigned to the access control device, wherein each sensor comprises a light barrier for checking at least one security feature, comprising a number of passing persons, wherein the at least one access barrier element, the at least one read unit, and the sensor network, each being at least indirectly connected to at least one computer unit of the access control device, wherein the at least one computer unit has a storage element, in which permissible at least one legitimation feature, at least one security feature, and target values are stored, and a comparison of the at least one legitimation feature read by the at least one read unit to the stored at least one legitimation feature and a check of the security feature detected by the sensor network to the permissible at least one security feature of the access control device being performed by the at least one computer unit, and the access barrier element being releasable automatically as a function of the result of the comparison, wherein the at least one computer unit of the access control device is additionally provided with an operating element for setting predefined security steps, and a defined parameterization of the at least one computer unit is assigned to each of the predefined security steps in such a manner that, as a function of the respectively set security step, the number of checked security and legitimation features and their particular tolerance threshold with respect to the security and legitimation feature stored in the at least one computer unit are uniquely predefined by selection of the security step using the operating element, wherein the operating element is a graduated or continuously adjustable rotary switch and allows the setting of the predefined security steps to be manually controlled in a simple manner by a security personnel at the access control device;

wherein each sensor of the sensor network is connected or disconnected using the operating element; and wherein the light barriers are arranged vertically on guide elements defining a passage, and whose optical axes are situated transversely to a passage direction through the access control device in a longitudinal direction of the guide elements and intersect with one another diagonally while forming rhombuses, the number of the light barriers being turned on being increased and decreased as a result of connecting and disconnecting rhombus fields as a result of the security step selected by the operating element.

2. The access control device according to claim 1, wherein parameterization software is assigned to the operating element in a manner that the predefined security steps selectable using the operating element are each assigned a defined number of the security feature and the legitimation feature to be checked in a settable and changeable manner using the parameterization software.

3. The access control device according to claim 1, wherein the at least one legitimation feature comprises at least one biometric feature is checkable using the at least one read unit, the degree of the correspondence to be required of the at least one biometric feature acquired using the at least one read unit being settable as a function of the selected security step in each of the predefined security steps using the operating element.

4. The access control device according to claim 1, wherein the at least one computer unit is incorporated in a data network, preferably an intranet, a WLAN network, and/or in the Internet, and the operating element and the parameterization software is thus operable remotely controlled.

* * * * *